United States Patent
Ramage

[11] 3,861,236
[45] Jan. 21, 1975

[54] POSITIVE LOCK FORCE RATIO CHANGER

[75] Inventor: Jerrie K. Ramage, South Bend, Ind.

[73] Assignee: The Bendix Corporation, South Bend, Ind.

[22] Filed: Nov. 12, 1973

[21] Appl. No.: 415,263

[52] U.S. Cl.................... 74/512, 74/517, 188/360
[51] Int. Cl............................................. G05g 1/14
[58] Field of Search............ 74/512, 516, 517, 518, 74/470, 560; 64/27 NM; 403/274–277, 280, 242, 366, 367, 372; 91/391 A; 188/129, 360

[56] References Cited
UNITED STATES PATENTS

| | | | |
|---|---|---|---|
| 3,302,481 | 2/1968 | Kendrick et al. | 74/512 |
| 3,693,474 | 2/1971 | Trick | 74/518 X |
| 3,739,579 | 6/1973 | Lutz | 74/512 X |

Primary Examiner—Samuel Scott
Assistant Examiner—Frank H. McKenzie, Jr.
Attorney, Agent, or Firm—Leo H. McCormick, Jr.; William N. Antonis

[57] ABSTRACT

A force transfer mechanism whereby an input force from a lever arm is transmitted from a resilient member through a block of deformable material to provide a push rod with an operational force. The deformable material is retained in a housing with a plurality of radial openings. A friction pad located in each of the radial openings is brought into contact with the deformable material. A sleeve which surrounds the housing is connected to the lever arm through a fixed linkage. As the need for a greater operational force from the push rod increases, the deformable material expands causing the friction pads to secure the sleeve to the housing. With the sleeve secured to the housing, the input force from the lever arm is transmitted through the fixed linkage to provide a greater mechanical advantage than could be achieved by transmission through the resilient member.

4 Claims, 2 Drawing Figures

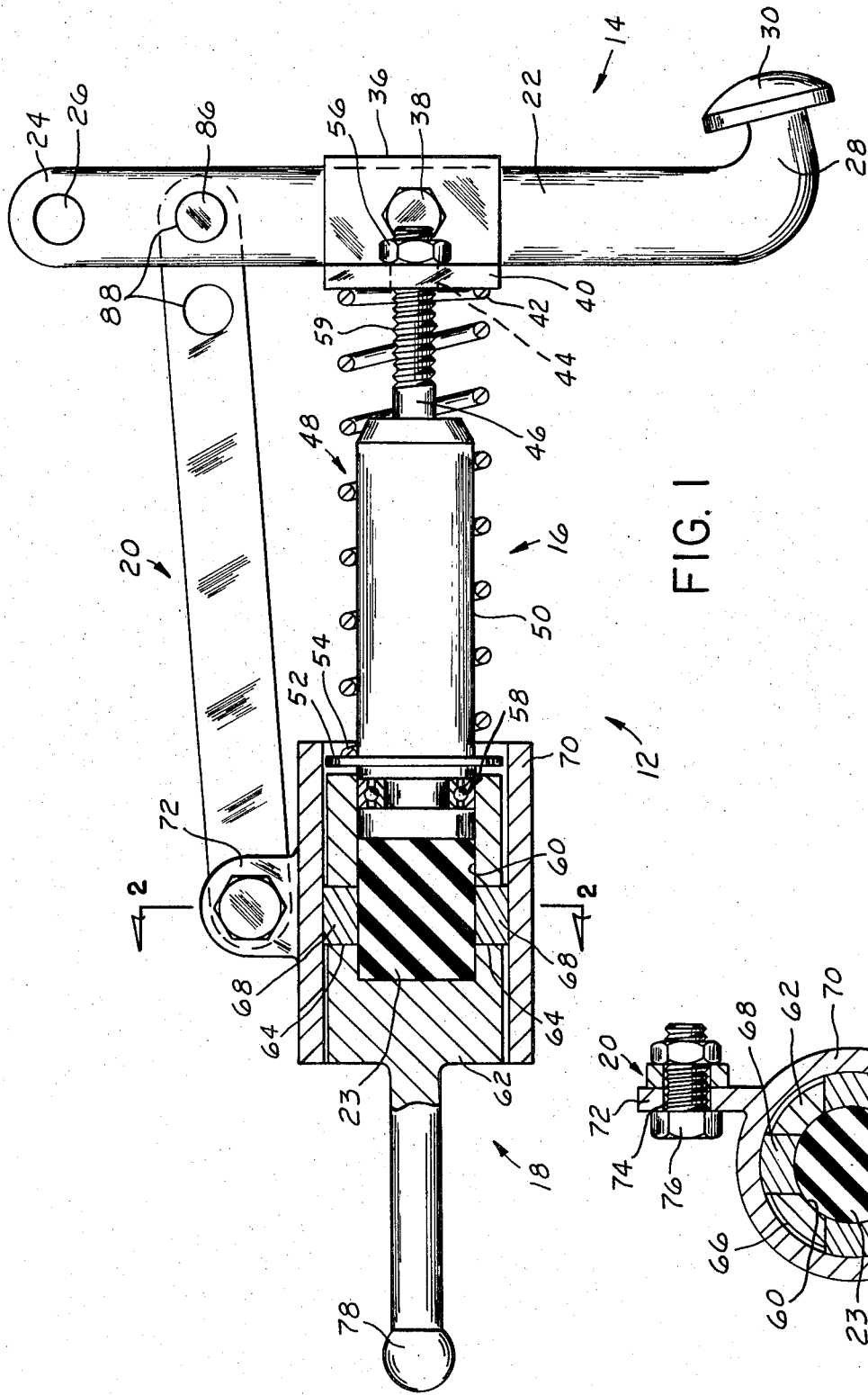

POSITIVE LOCK FORCE RATIO CHANGER

BACKGROUND OF THE INVENTION

Most automotive vehicles now produced are equipped with a power assist servomotor to operate the braking system. In vehicles where the servomotor is operated through the creation of a pressure differential between vacuum and air across a movable wall when the available vacuum is reduced or terminated, the operator of the vehicle must manually provide the input force to operate the braking system.

In order to increase the effectiveness of the input force when fluid power is unavailable, various devices, such as those termed "pop-up pedal" devices, have been made available. In most of these devices, the location through which the input force is transmitted is shifted to provide a pedal with a different leverage transmission point. Examples of these devices can be seen in U.S. Pat. No. 3,142,199 where toggle linkage changes the leverage point, U.S. Pat. No. 3,275,891 where vacuum controlled levers change the point of application, and by a positioning slot on the pedal arm as shown in U.S. Pat. No. 3,063,427. In addition to the numerous parts that are needed to bring the pedal into the different position, if power is lost when the vehicle is moving, the pedal pops up and it takes the operator some time to adjust to this new pedal height.

Later in U.S. Pat. No. 3,633,366, incorporated herein by reference, an apparatus is dislcosed wherein a dual lever ratio input force was developed to maintain the pedal in the same physical height at all times, with and without power. In this device a first force transmitting member is separated by a gap from the valve operating the servomotor until the force required to operate the servomotor, which force is transmitted through a first resilient member of a second force transmitting member, is sufficient to compress the resilient member and close the gap. With the gap closed, further input is then transmitted through the first force transmitting member. However, during the period of time it takes to close the gap, the operator experiences a feeling that the input force is failing to properly operate the valve rod which supplies an input to the servomotor.

Still later in U.S. Pat. No. 3,733,822, incorporated herein by reference, an apparatus is disclosed wherein means can convert a single input force into a multiratio output force in response to an operational force needed by a pressure controlled power device. In this apparatus a deformable confined medium separates an input member from the output member. Initially, the confined medium acts as a solid-like body and directly carries the input force to the output member. When a predetermined operational force develops, the opposition between the operational force and the input force transforms the characteristics of the confined medium from a solid-like body to a liquid-like body. Further force from the input member is directed into the liquid-like body to create a fluid pressure. This fluid pressure acting on an area of the output will create the operational force needed to activate the pressure controlled power device. However, in some instances, this transformation can take place before the output member has travelled a sufficient distance to operate the brake system effectively.

SUMMARY OF THE INVENTION

I have designed a force transfer mechanism which is force sensitive, adjustable, and has good repeatability of force transmission over an extended period of time to provide a push rod means with a dual ratioed output to meet varying operational conditions.

The force transfer mechanism has a first force transmission means located on a lever arm a first distance from a pivot pin and a second force transmission means located on the lever arm a second distance from the pivot pin. The first force transmission means has a resilient means connected to a confined deformable material in a push rod means. A series of friction pads extends from the confined deformable material to adjacent a sleeve which surrounds the confined deformable medium. A linkage means of a second force transmission means pivotally connects the sleeve with the lever arm. When the operational force through the push rod means exceeds a predetermined force, the deformable material expands to urge the friction pads into engagement with the sleeve. Any further input from the lever arm is transmitted through the linkage to the push rod at a greater mechanical advantage than through the resilient means.

It is therefore the object of this invention to provide a force transmission apparatus with the means of shifting from a resilient means to a fixed linkage means in response to an increased operational need.

It is another object of this invention to provide a force transmission apparatus with the means of uniformly transferring from a first force ratio to a second force ratio in response to a sensed output requirement.

It is a further object of this invention to provide a dual ratio force transmission means with an adjustable means to change the sequence of transformation of an input force from a resilient means to a fixed linkage means.

BRIEF DESCRIPTION OF THE DRAWINGS

FIG. 1 is a sectional view of a force transmission mechanism having the means to shift from a first ratio to a second ratio in response to an operational requirement.

FIG. 2 is a sectional view taken along line 2—2 of FIG. 1.

DETAILED DESCRIPTION OF THE PREFERRED EMBODIMENT

The force transfer mechanism 12 shown in FIG. 1 has a lever means 14 connected through a resilient means 16 and a linkage means 20 to a push rod means 18. A confined deformable material 23 in the push rod means 18 responds to an operational output requirement to lock the linkage means 20 to the push rod means 18 and thereby transfer the transmisssion of input force of the lever means 14 from the resilient means 16 to the fixed linkage means 20. With the input force transmitted through the linkage means 20, a greater mechanical advantage can be achieved than through the resilient means 16 and thereby meet the increased operational requirement of the push rod means 18.

In more particular detail, the lever means 14 includes an arm 22 having a first end 24 located on a fixed pin 26 and a second end 28 to which pedal 30 is attached. A bracket 36 is attached to arm 22 a first distance from pin 26 by bolt 38. Bolt 38 has a smooth shoulder (not shown) on which bracket 36 rests, this will permit rotation as arm 22 rotates about pin 26 in response to an input force being applied to pedal 30.

The bracket 36 has a side projection 40 on which one end 42 of the resilient means 16 is located. The side projection 40 has an axial opening 44 through which the small diameter end 46 of shaft means 48 extends. The shaft means 48 has a large diameter section 50 which substantially supports the resilient means 16 throughout its entire length. The large diameter section 50 has a shoulder 52 against which the other end 54 of the resilient means 16 is located. A nut or other keeper means 56 is mated with threads 59 on the small diameter section 46 of the shaft means 48 to adjust the preload tension of the resilient means 16 between the shaft means 48 and the arm 22.

The large diameter section 50 of the shaft means is connected to a piston means 58. The piston means 58 is located in a bore 60 of the housing 62 of the push rod means 18 wherein the deformable material means 23 is located. The housing 62 has a plurality of radial openings 64 which extend from the bore 60 to the periphery 66. A corresponding plurality of friction pads 68 are located in the openings 64.

A sleeve means 70 which surrounds the housing 62 has a vertical projection 72 which extends from the top thereof. The vertical projection 72 has an axial opening 74, see FIG. 2, through which pin 76 extends to connect linkage means 20 from the arm 22 to the sleeve means 70.

The linkage means 20 is connected to the lever 22 by pin 86 which is located between pin 26 and bolt 38. The linkage means 20 has a plurality of holes 88 in order that sleeve 70 may be positioned on the push rod means 18 to account for the compression of resilient means 16 in response to a resistive force communicated through the push rod.

MODE OF OPERATION OF THE PREFERRED EMBODIMENT

An input force is applied to pedal 30 which will cause arm 22 to rotate about pin 26. This input force will be carried through resilient means 16 to shoulder 52 and move piston means 58 against the deformable means 23. The deformable means 23 will directly transmit the input force through the housing 62 to operate the push rod means 18. As arm 22 rotates about pin 26, linkage means 20 will proportionally move sleeve means 70 with relation to the housing 62.

When the operational requirement from the push rod means 18 reaches a predetermined level, deformable material means 23 will expand causing friction pad means 68 to engage the sleeve means 70. With the sleeve means 70 secured to the housing 62, further input applied to pedal 30 will be transmitted through pin 86 to the fixed linkage means 20 to provide a greater mechanical advantage than could be achieved through transmission by the resilient means 16.

Since pin 38 is at a greater distance from pivot pin 26 than pin 86 with the friction pads 68 locked to sleeve means 70, it is necessary that opening 44 in bracket 36 be large enough to permit the smaller diameter 46 to pass therethrough without binding. Ball 78 of the push rod means 18 will normally be fixed in a valve rod which is moved as the push rod means 18 moves. Since bracket 36 is free to pivot around pin 38, the force transfer mechanism 12 may be considered as pivoting about ball 78 as long as there is sufficient bearing between pad 68 and sleeve 70 so that they act as a rigid member. This rigidity will maintain the force transfer mechanism in a straight line between ball 78 and pin 38. A second link could be attached to sleeve 78 if its pivot point was placed at a point equal to the distance between point 26 and 38. This second link is not required but could reduce the need for close tolerance between the pads 68 and sleeve 70.

upon termination of the operational force, deformable means 23 will contract thereby relieving the holding force between the pads 68 and sleeve 70. With sleeve 70 free to move with respect to the push rod means 62, resilient means 16 will again transmit the input force between arm 22 and push rod 62.

Upon termination of the input force on pedal 30, the force transfer mechanism will return to the position shown in FIG. 1.

I claim:

1. A force transfer mechanism comprising:

push rod means having a bore therein with a plurality of radial openings extending from said bore to the periphery of said rod means;

pad means located in said radial openings;

deformable means located in said bore and in contact with said pad means;

sleeve means surrounding said push rod means;

piston means located in said bore and in contact with said deformable means;

first lever means having a first end pivotally connected to a body and a second end through which an input force is transmitted;

linkage means pivotally connected to said first lever means a first distance from said first end and said sleeve means;

shaft means secured to said piston means and pivotally attached to said first lever means a second distance from said first end; and resilient means connected to said lever means and said piston means for initially transmitting said input force through said deformable means to move said push rod means, said resilient means being compressed by the input force upon movement of the push rod means, said deformable means expanding in response to said movement thereby causing said pad means to engage said sleeve means andd secure said linkage means to the push rod means, said linkage means transferring any further input force to the push rod means to achieve a greater mechanical advantage than could be achieved by transmission of the input force through the resilient means.

2. The force transfer mechanism, as recited in claim 1, wherein said shaft means includes:

a first cylindrical section with a first diameter for providing a guide to maintain said resilient means in axial alignment with said push rod means; and a second cylindrical section having a second diameter smaller than said first diameter, said second diameter having threads thereon.

3. The force transfer mechanism, as recited in claim 2, wherein said first lever means includes:

bracket means having an axial opening through which said second cylindrical section extends; and adjustable means secured to said threads on the second cylindrical section for caging said resilient means between said bracket and the first cylindrical section.

4. The force transfer mechanism, as recited in claim 3, wherein said second cylindrical section can freely move in the axial opening in the bracket means during compression of said resilient means.

* * * * *